US012733572B2

(12) United States Patent
Curtis, IV et al.

(10) Patent No.: US 12,733,572 B2
(45) Date of Patent: Sep. 15, 2026

(54) TORQUE BALANCING SCHEME FOR A VELOCITY CONTROLLED DRIVE SYSTEM OF A MOWER

(71) Applicant: FireFly Automatix, Inc., Salt Lake City, UT (US)

(72) Inventors: George F. Curtis, IV, Orem, UT (US); Eric E. Aston, Farmington, UT (US); Mark C. LeBlanc, Salt Lake City, UT (US)

(73) Assignee: FireFly Robotics, Inc., Salt Lake City, UT (US)

( * ) Notice: Subject to any disclaimer, the term of this patent is extended or adjusted under 35 U.S.C. 154(b) by 226 days.

(21) Appl. No.: 18/618,952

(22) Filed: Mar. 27, 2024

(65) Prior Publication Data

US 2025/0301948 A1 Oct. 2, 2025

(51) Int. Cl.

| | |
|---|---|
| ***A01D 34/00*** | (2006.01) |
| ***A01D 101/00*** | (2006.01) |
| ***B60L 15/20*** | (2006.01) |

(52) U.S. Cl.

CPC ........ *A01D 34/008* (2013.01); *B60L 15/2036* (2013.01); *A01D 2101/00* (2013.01); *B60L 2200/40* (2013.01); *B60L 2240/12* (2013.01); *B60L 2240/24* (2013.01); *B60L 2240/421* (2013.01); *B60L 2240/423* (2013.01)

(58) Field of Classification Search

CPC ............................ B60L 15/20; B60L 15/2036

See application file for complete search history.

(56) References Cited

FOREIGN PATENT DOCUMENTS

CN 114348002 A * 4/2022

* cited by examiner

*Primary Examiner* — Said Bouziane

(74) *Attorney, Agent, or Firm* — Kirton McConkie; Brian Tucker

(57) ABSTRACT

A torque balancing scheme for a velocity controlled drive system of a mower is provided. The torque balancing scheme can be employed on any mower or other similar vehicle having a drive system in which a separate motor is used to independently drive each wheel. By implementing the torque balancing scheme, a drive system can prevent excessive heating of the motors that may otherwise occur when unaccounted-for factors exist.

20 Claims, 8 Drawing Sheets

TORQUE BALANCING SCHEME FOR A VELOCITY CONTROLLED DRIVE SYSTEM OF A MOWER

CROSS-REFERENCE TO RELATED APPLICATIONS

N/A

BACKGROUND

Golf courses, sod farms, parks and other establishments with expansive grassy areas typically employ large commercial mowers to cut grass. Such mowers oftentimes have a drive system where each wheel is independently driven by a separate motor. For example, a mower with four wheels may have four motors for independently rotating and steering each wheel. Commercial mowers sometimes include three wheels (e.g., two front wheels and one rear wheel), and in such cases, the mower could include three motors.

FIG. 1 provides an example of a mower 100 on which one or more embodiments of the present disclosure could be implemented. Mower 100 includes a main body 110 with wheels 130 positioned at each corner of main body 110. Multiple mower decks 120 are positioned in front of and under main body 110. Mower 100 could include a drive system having four separate motors for independently driving each wheel 130.

In a drive system where a separate motor controls each wheel, it can be difficult to balance the operation of the motors. This is especially true when the motors operate in velocity mode (i.e., when each motor is configured to maintain the velocity (e.g., the RPM) of the corresponding wheel). If the operation of the motors is not balanced, the motor experiencing the greater load is likely to overheat. As an example, if one tire becomes underinflated, the corresponding motor may require decreased current to maintain the RPM of the wheel/tire. This decreased current of the corresponding motor may gradually increase the current and therefore the temperature of the other motors (e.g., to compensate for the reduced torque the corresponding motor is providing to propel the mower) and may eventually cause one or more of the other motors to shut down to avoid damage.

BRIEF SUMMARY

The present disclosure is directed to a torque balancing scheme for a velocity controlled drive system of a mower and to mowers and drive systems that are configured to implement the torque balancing scheme. The torque balancing scheme can be employed on any mower or other similar vehicle having a drive system in which a separate motor is used to independently rotate each wheel. By implementing the torque balancing scheme, a drive system can prevent excessive heating of the motors that may otherwise occur when unaccounted-for factors exist.

In some embodiments, a mower may include a plurality of wheels for causing the mower to travel with a ground speed, a plurality of motors, each of which rotates a corresponding one of the plurality of wheels, and a controller that is configured to implement a method for balancing torque of the plurality of motors. The controller can generate a combined torque for each of the plurality of motors and generate one or more comparisons from the combined torques. The controller can also calculate one or more velocity correction factors from the one or more comparisons and correct a velocity of at least one of the plurality of motors using the one or more velocity correction factors.

In some embodiments, computer storage media can store computer executable instructions which when executed implement a torque balancing scheme. Torque measurements can be obtained for each of a plurality of motors including a left, front motor, a left, rear motor, a right, front motor, and a right, rear motor. A combined torque can be generated for each of the motors using the respective torque measurements. A left-side front-to-rear comparison can be generated from the combined torques for the left, front motor and the left, rear motor and a right-side front-to-rear comparison can be generated from the combined torques for the right, front motor and the right, rear motor. A left-side velocity correction factor can be adjusted based on the left-side front-to-rear comparison and a right-side velocity correction factor can be adjusted based on the right-side front-to-rear comparison. Velocities of the left, front motor and the left, rear motor can be corrected using the left-side velocity correction factor and velocities of the right, front motor and the right, rear motor can be corrected using the right-side velocity correction factor.

In some embodiments, a method is provided for balancing torque of a plurality of motors that each independently rotate one of a plurality of wheels. It can be determined that a first motor that rotates a first wheel is requiring more torque than a second motor that rotates a second wheel that is opposite the first wheel. Based on the determination, a velocity correction factor can be calculated. A velocity for the first motor can be reduced based on the velocity correction factor. A velocity for the second motor can be increased based on the velocity correction factor.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features can be obtained, a more particular description will be rendered by reference to specific embodiments which are illustrated in the appended drawings. These drawings depict only typical embodiments and are not therefore to be considered to be limiting.

DETAILED DESCRIPTION

Embodiments of the present disclosure can be implemented on any mower that includes a drive system in which each wheel is independently rotated by a separate motor. Such mowers may oftentimes include multiple mower decks, but embodiments of the present disclosure should not be limited by the number of mower decks a mower may have. Such mowers may also be manually driven or autonomous. Embodiments of the present disclosure will be described primarily in the context of a mower having four wheels such as mower 100. However, such embodiments may also be employed on mowers having three wheels.

Figure 1:
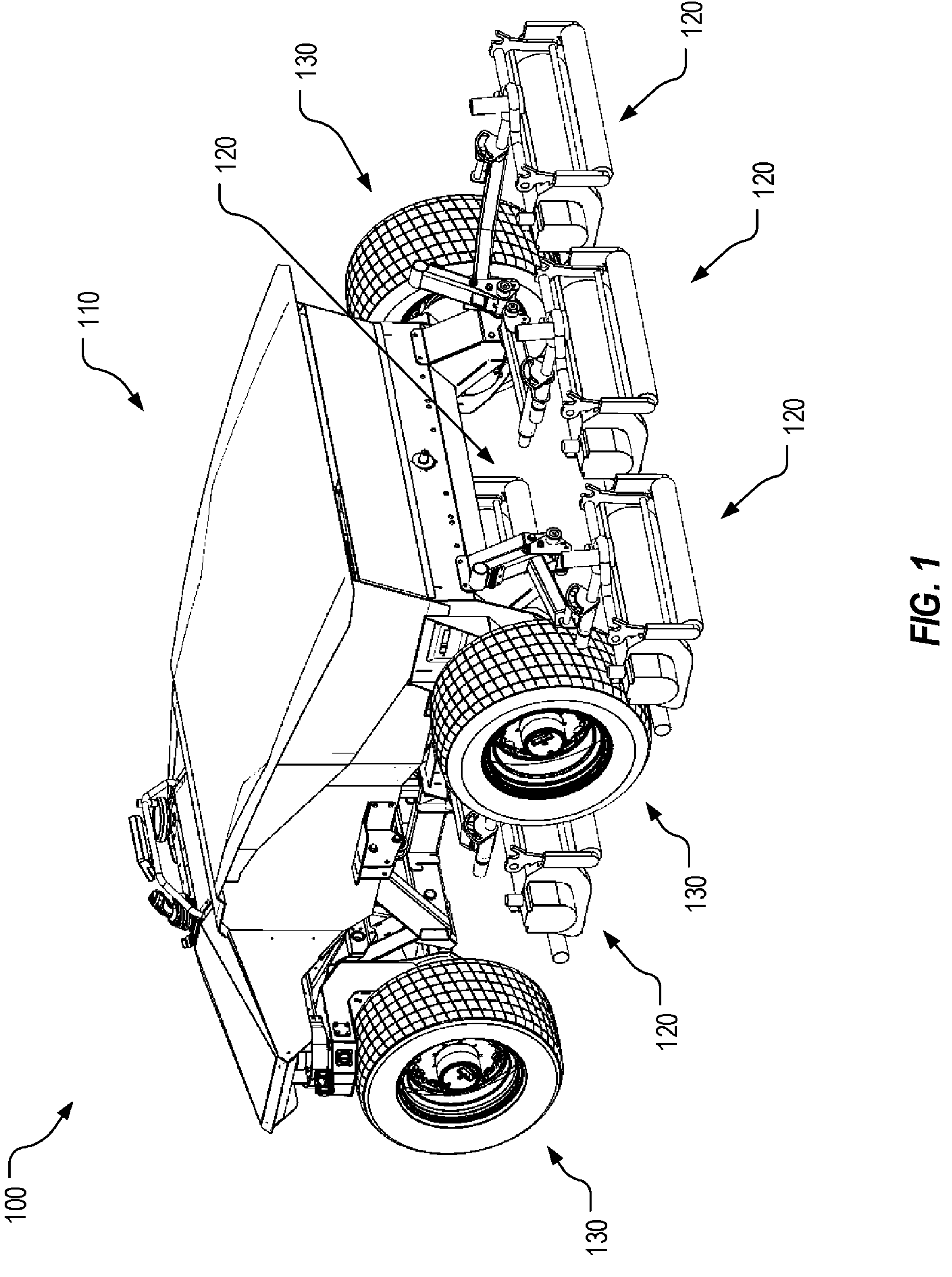
FIG. 1 illustrates an example of a mower on which one or more embodiments of the present disclosure could be implemented.
Figure 2:
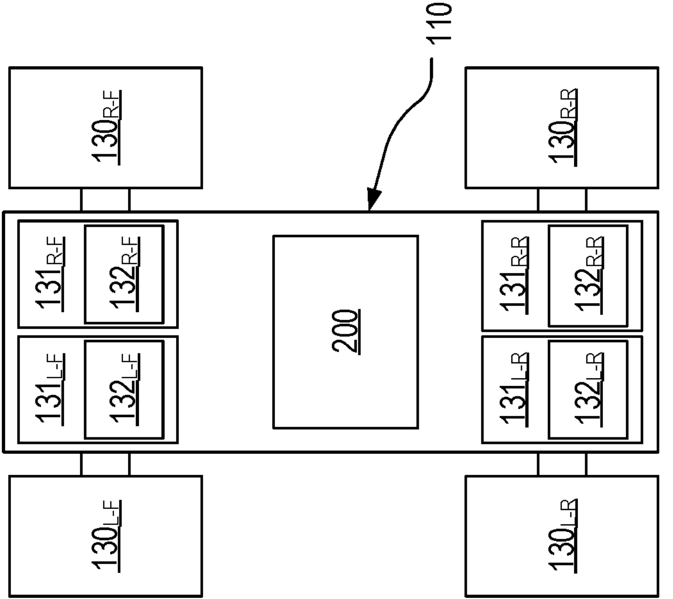
FIG. 2 is a block diagram of components of a mower that can be employed to implement one or more embodiments of the present disclosure.
Figure 2:
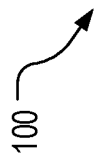

FIG. 2 provides a block diagram of mower 100 when it is configured in accordance with one or more embodiments of the present disclosure. In this block diagram, mower decks 120 are not shown. Notably, a mower on which embodiments of the present disclosure are implemented could include any number and/or configuration of mower decks. Mower 100 can include a left, front wheel $\mathbf{130}_{L\text{-}F}$, a left, rear wheel $\mathbf{130}_{L\text{-}R}$, a right, front wheel $\mathbf{130}_{R\text{-}F}$ and a right, rear wheel $\mathbf{130}_{R\text{-}R}$ on which main body 110 is supported. Mower 100 may also include a controller 200 which can represent any suitable circuitry or combination of circuitry which can be configured to perform the functionality described herein. Such circuitry could include a central processing unit, a microprocessor, a microcontroller, a field programming gate array, an application-specific integrated circuit, a system on a chip, etc.

Mower 100 may also include a wheel-specific driving unit $\mathbf{131}_{L\text{-}F}$, $\mathbf{131}_{L\text{-}R}$, $\mathbf{131}_{R\text{-}F}$, $\mathbf{131}_{R\text{-}R}$ (generally driving unit(s) 131) for each wheel $\mathbf{130}_{L\text{-}F}$, $\mathbf{130}_{L\text{-}R}$, $\mathbf{130}_{R\text{-}F}$, $\mathbf{130}_{R\text{-}R}$ (generally wheel(s) 130) respectively. Driving units 131 can represent any suitable components for accomplishing the functionality described herein and can each include a motor $\mathbf{132}_{L\text{-}F}$, $\mathbf{132}_{L\text{-}R}$, $\mathbf{132}_{R\text{-}F}$, $\mathbf{132}_{R\text{-}R}$ respectively (generally motor(s) 132) for causing the corresponding wheel $\mathbf{130}_{L\text{-}F}$, $\mathbf{130}_{L\text{-}R}$, $\mathbf{130}_{R\text{-}F}$, $\mathbf{130}_{R\text{-}R}$ respectively to rotate at a particular angular velocity (e.g., which can be represented in RPMs). In this context, the term "motor" can be construed as encompassing a drive that functions as the motor's electrical interface with controller 200. In embodiments where mower 100 is configured to be steered by rear wheels $\mathbf{130}_{L\text{-}R}$ and $\mathbf{130}_{R\text{-}R}$, rear driving units $\mathbf{131}_{L\text{-}R}$ and $\mathbf{131}_{R\text{-}R}$ can also include a steering mechanism (e.g. a linear actuator, whether electric, hydraulic or otherwise, such as a rack and pinion) for orienting wheels $\mathbf{130}_{L\text{-}R}$ and $\mathbf{130}_{R\text{-}R}$ respectively at a particular angle relative to main body 110. In embodiments where mower 100 is configured to be steered by front wheels $\mathbf{130}_{L\text{-}F}$ and $\mathbf{130}_{R\text{-}F}$, front driving units $\mathbf{131}_{L\text{-}F}$ and $\mathbf{131}_{R\text{-}F}$ can include a steering mechanism (e.g. a linear actuator, whether electric, hydraulic or otherwise, such as a rack and pinion) for orienting wheels $\mathbf{130}_{L\text{-}F}$ and $\mathbf{130}_{R\text{-}R}$ respectively at a particular angle relative to main body 110.

Regardless of the specific type of components that may be used to implement driving units 131, motors 132 can be configured to receive control signals from controller 200 which control the rotation of the motors and therefore the rotation of the respective wheels 130. Controller 200 and motors 132 can be configured to operate in velocity mode (i.e., controller 200 and motors 132 represent components of a velocity controlled drive system for mower 100). For example, one or more sensors (not shown) can be employed to monitor the actual velocity of each motor 132. Based on the actual velocities reported by the sensors, controller 200 may output control signals to cause motors 132 to remain at or to return to the ideal velocities as described further below. U.S. Pat. Publ. No. 2023/0076632, which is incorporated herein by reference, describes some steering techniques in which the wheels may be driven at different velocities. Embodiments of the present disclosure could be used in conjunction with such steering techniques.

As introduced in the background, when controller 200 and motors 132 operate in velocity mode, unaccounted-for factors could result in one of motors 132 experiencing excessive torque relative to the other motors. As one simplified example, if the tire on wheel $\mathbf{130}_{L\text{-}F}$ is inflated more than the tire on wheel $\mathbf{130}_{L\text{-}R}$, a greater torque may be required to rotate wheel $\mathbf{130}_{L\text{-}F}$ at the same velocity as wheel $\mathbf{130}_{L\text{-}R}$. To accomplish this, controller 200 may increase the magnitude, frequency or other parameters of the control signal for motor $\mathbf{132}_{L\text{-}R}$ relative to the control signal for motor $\mathbf{132}_{R\text{-}R}$ to thereby keep the velocities of wheels $\mathbf{130}_{L\text{-}R}$ and $\mathbf{130}_{L\text{-}R}$ equal. Yet, this adjustment to the control signal for motor $\mathbf{132}_{L\text{-}F}$ may cause the temperature of motor $\mathbf{132}_{L\text{-}F}$ to rise (e.g., due to the increased current motor $\mathbf{132}_{L\text{-}F}$ draws). Over time, this increase in temperature can cause motor $\mathbf{132}_{L\text{-}F}$'s performance to degrade or even cause motor $\mathbf{132}_{L\text{-}F}$ to shut off.

There could be many factors, whether unaccounted-for, unpredictable, or otherwise impactful, that lead to torque imbalances between front and rear wheels and/or left and right wheels. For example, differences in traction could result in increased torque at motors $\mathbf{132}_{R\text{-}F}$ and $\mathbf{132}_{R\text{-}R}$ relative to motors $\mathbf{132}_{L\text{-}R}$ and $\mathbf{132}_{R\text{-}R}$. As another example, an unexpected load at one corner of mower 100 could increase the torque of the motor 132 at that corner while decreasing the torque of the motor 132 at an opposite corner. As an additional example, due to an undetectable structural change in the drive system, one of the wheels 130 could simply require a greater torque from the motor 132 to maintain the desired RPM. Regardless of the factor(s) causing a torque imbalance between motors 132 of the velocity controlled drive system, the torque balancing scheme of the present disclosure can be used.

Figure 3:
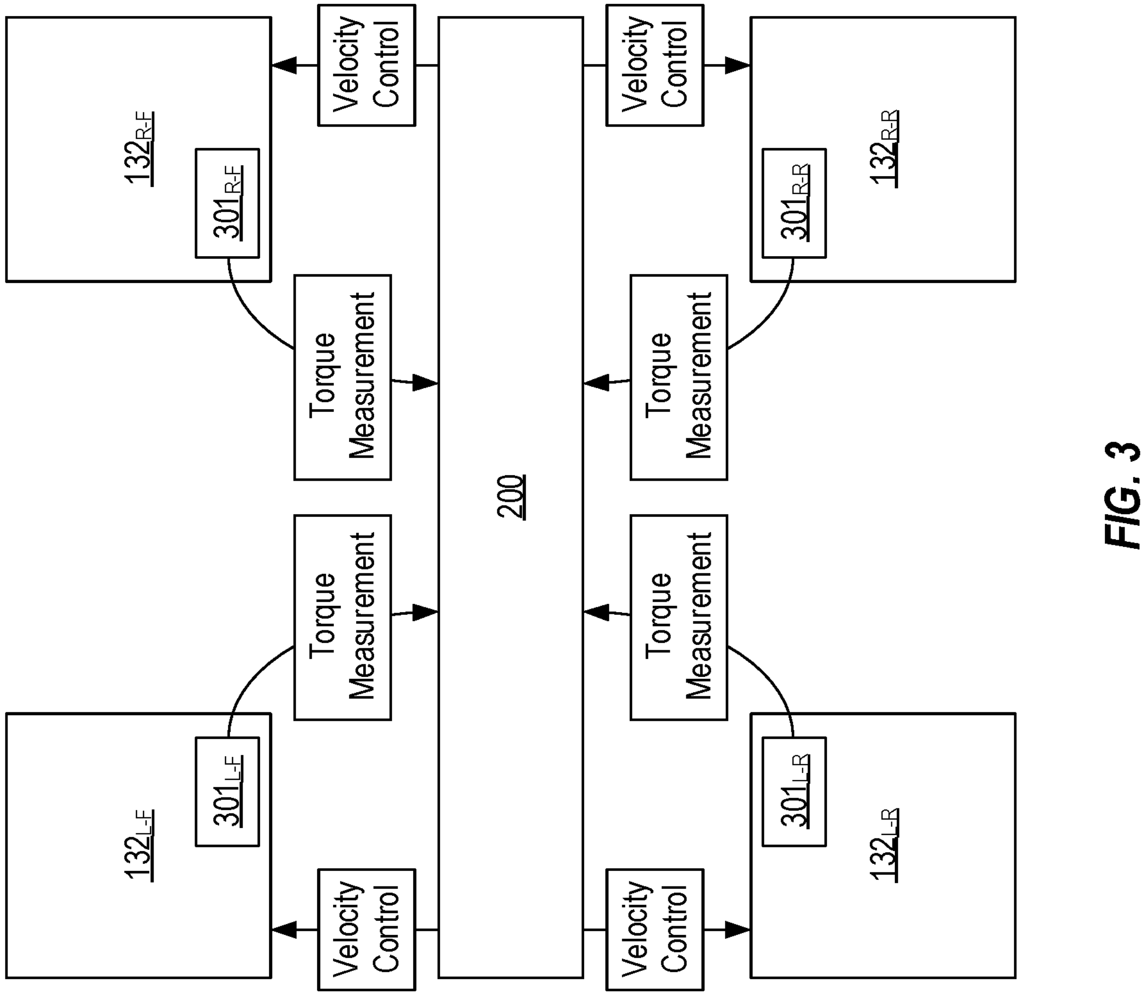
FIG. 3 provides an example of how various components can communicate to implement one or more embodiments of the present disclosure.

FIG. 3 provides a high-level example of how controller 200 can be configured to implement a torque balancing scheme in accordance with one or more embodiments of the present disclosure. FIG. 3 is based on FIG. 2 and therefore controller 200 is shown as controlling the four motors 132. However, controller 200 could employ the same or similar functionality to implement a torque balancing scheme on a mower with three motors for driving three wheels.

Controller 200 is shown as outputting a "velocity control" to each of motors 132 to thereby independently control the RPM of each wheel 130. The term "velocity control" is intended to encompass any suitable control signal for causing motors 132 to rotate wheels 130 at the desired velocity. For example, the velocity control could include one or more analog and/or digital signals that instruct the drive of the motor. Although not shown, controller 200 could receive velocity measurements for each motor/wheel and could use such measurements to calculate the velocity controls. For simplicity, velocity will be represented in RPMs in this description. Additionally, controller 200 can also output controls for controlling the relative angle of at least two of wheels 130 for steering purposes.

In accordance with embodiments of the present disclosure, motors $\mathbf{132}_{L\text{-}F}$, $\mathbf{132}_{L\text{-}R}$, $\mathbf{132}_{R\text{-}F}$, $\mathbf{132}_{R\text{-}R}$ can include at least one sensor $\mathbf{301}_{L\text{-}F}$, $\mathbf{301}_{L\text{-}R}$, $\mathbf{301}_{R\text{-}F}$, $\mathbf{301}_{R\text{-}R}$ respectively (generally sensor(s) 301) for generating a torque measurement for the respective motor. The term "torque measurement" is intended to encompass any suitable manner for representing the motor's torque. In some embodiments, sensors 301 could be current sensors given that the current drawn by the motor is proportional to the torque the motor generates. In some embodiments, sensors 301 could directly measure torque. In some embodiments, sensors 301 could measure both current and torque. In the remaining description, it will be assumed that the torque measurement is a current measurement. Accordingly, as controller 200 generates the velocity controls to cause motors 132 to rotate wheels 130, it can also monitor the torque of each of motors 132.

Figure 4A:
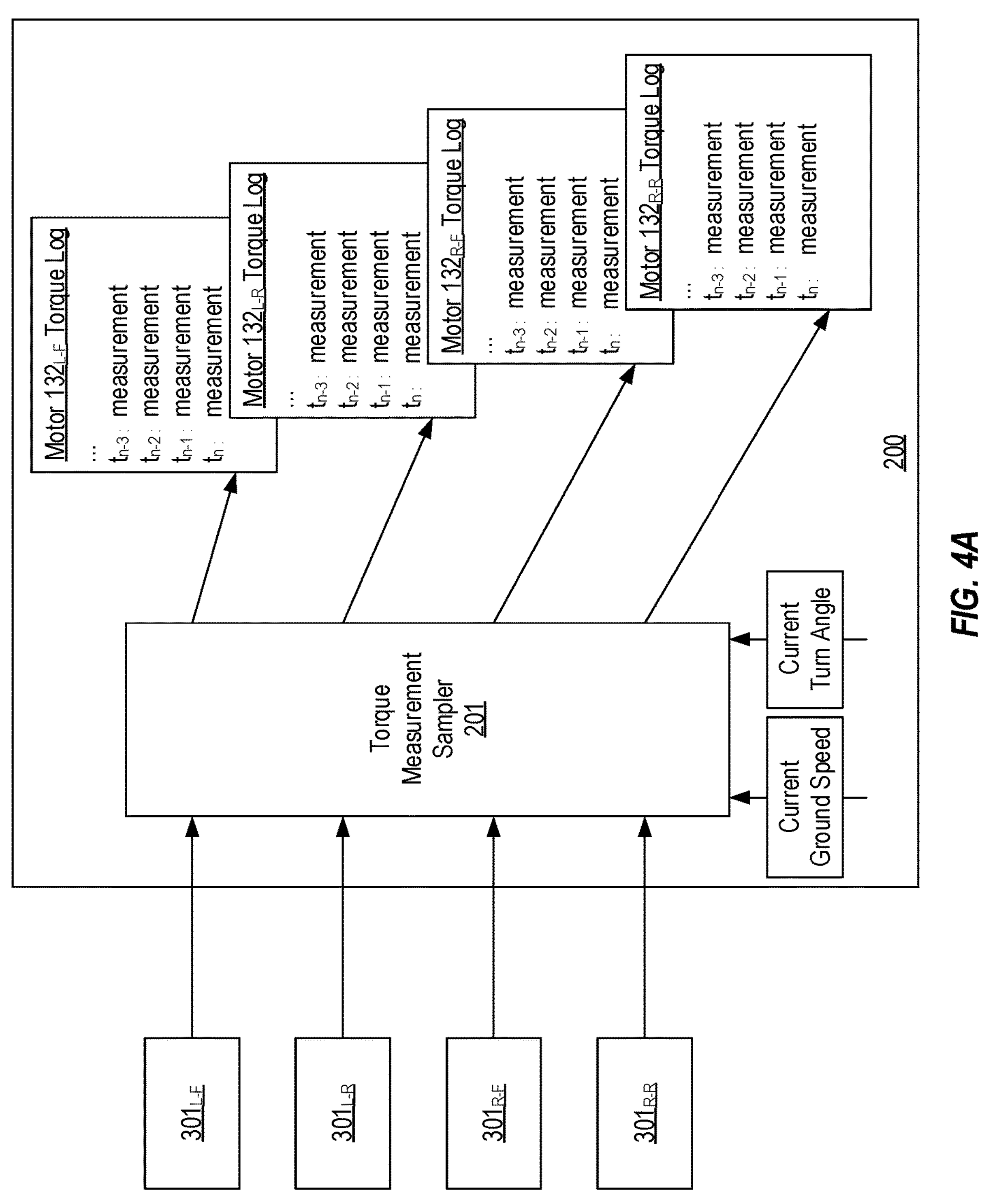
FIGS. 4A-4E provide an example of how a torque balancing scheme can be implemented in accordance with one or more embodiments of the present disclosure.
Figure 4B:
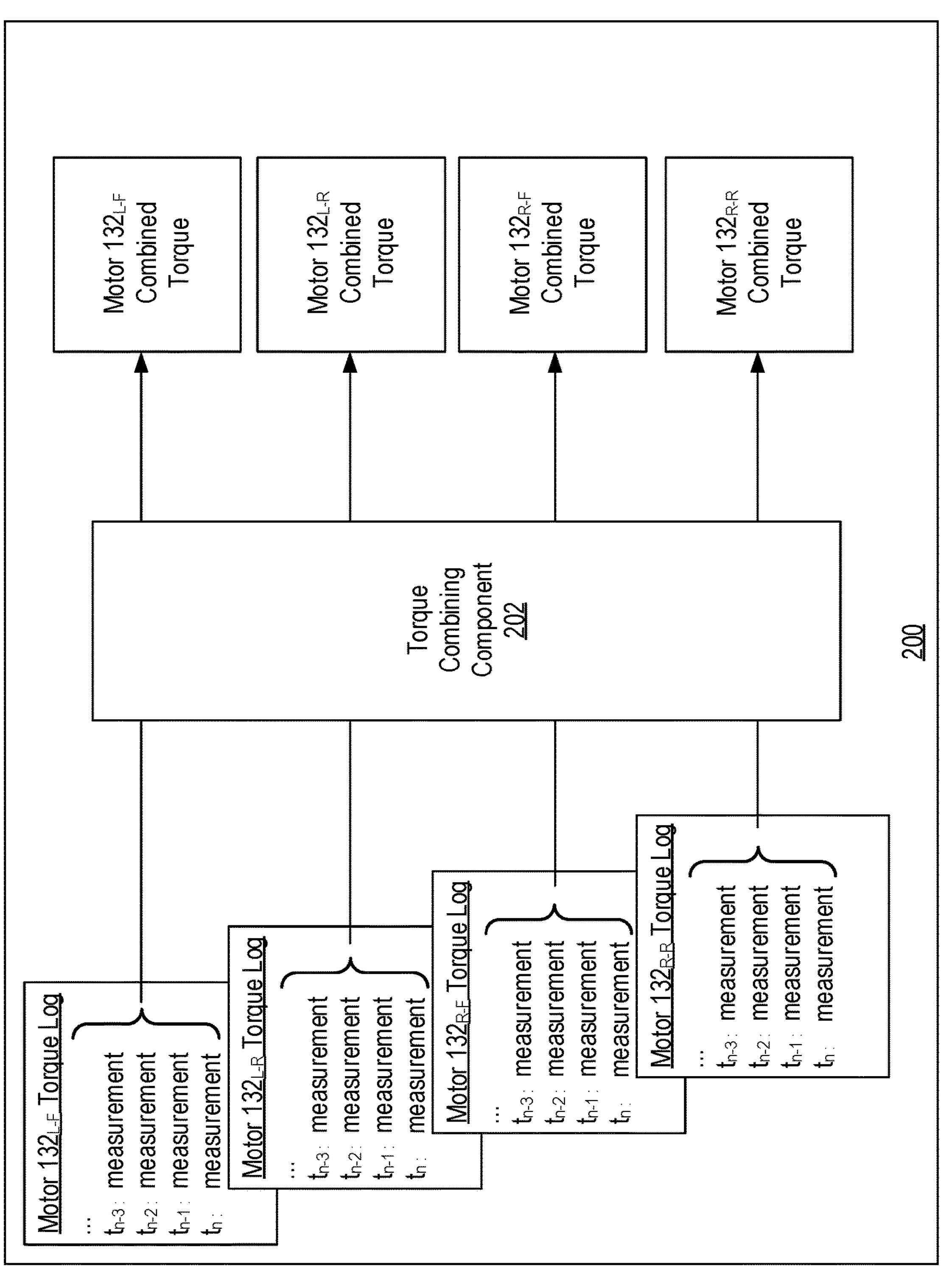
Figure 4C:
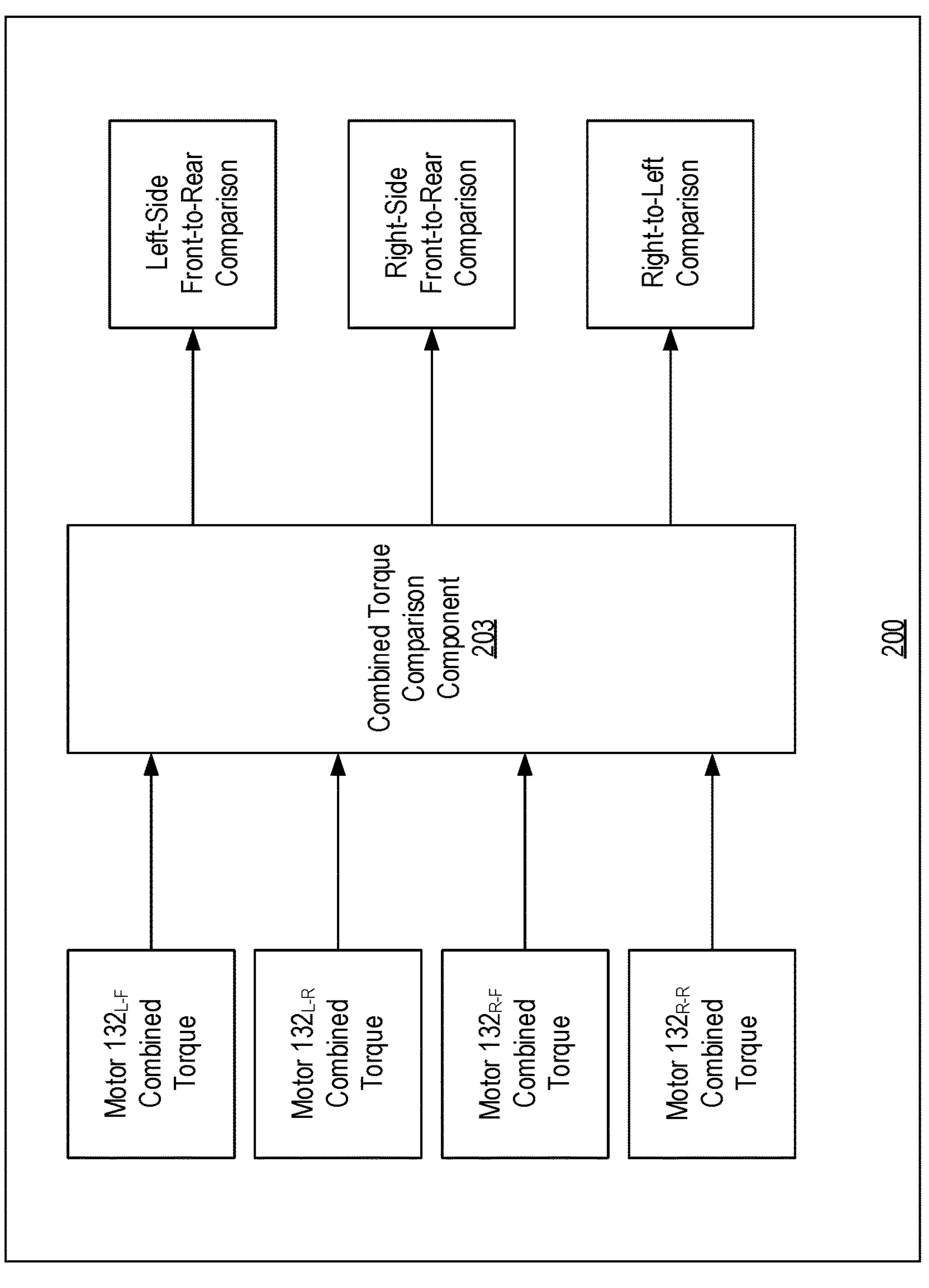
Figure 4D:
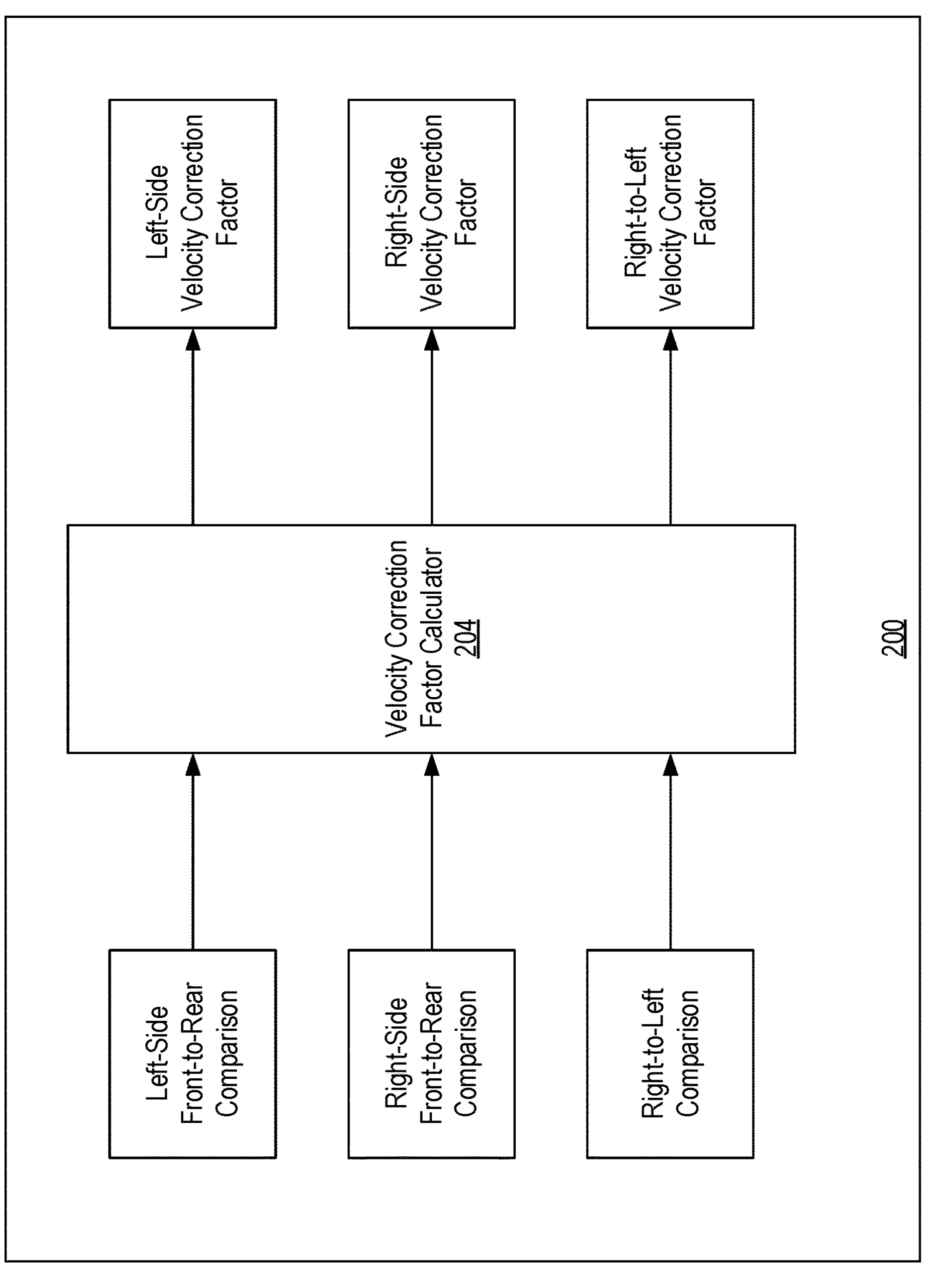
Figure 4E:
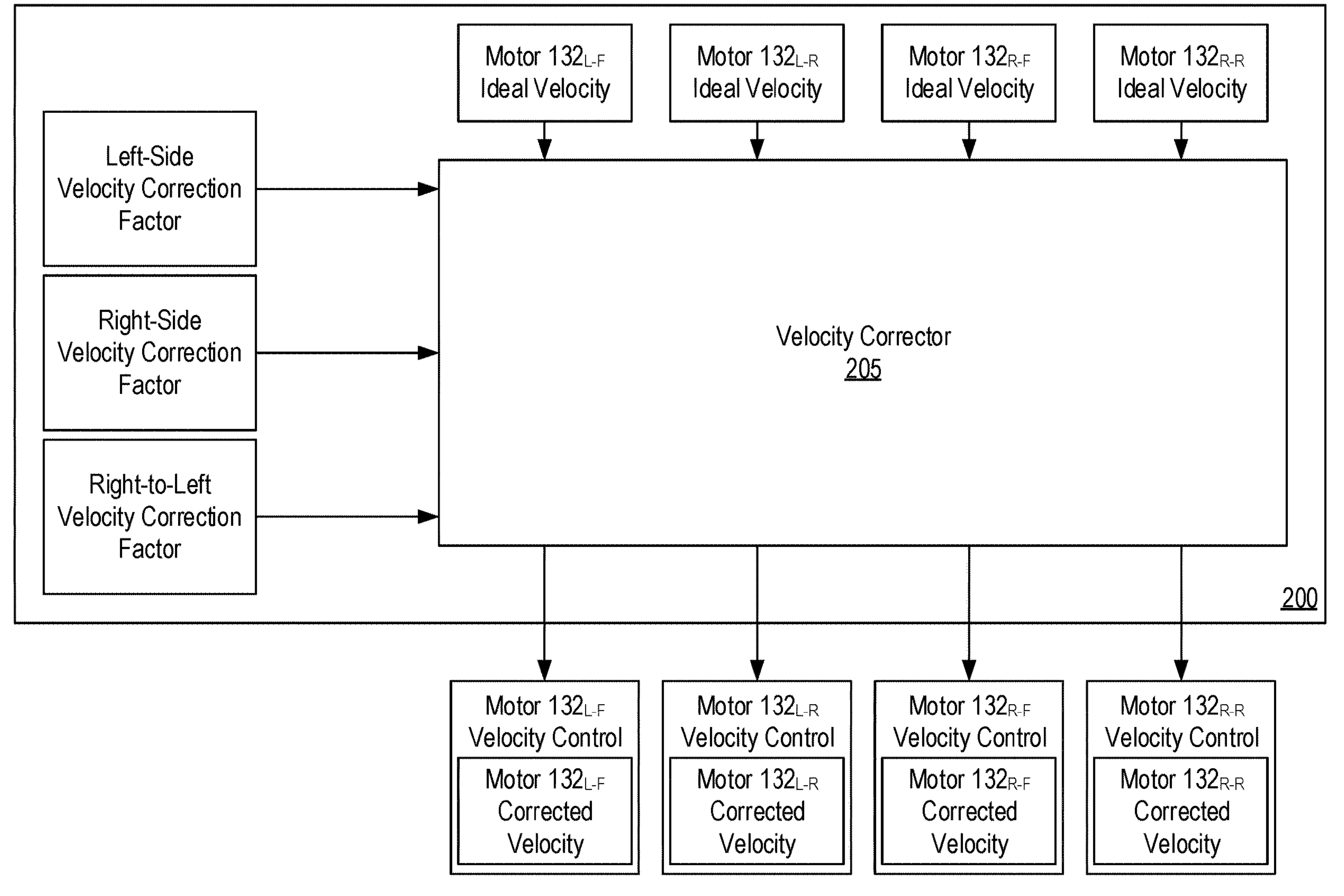

FIGS. 4A-4E provide an example of how a torque balancing scheme can be implemented in accordance with one or more embodiments. Embodiments of the torque balancing scheme involve five general steps: torque measurement (FIG. 4A); torque combining (e.g., summing and/or averaging) (FIG. 4B); combined torque comparison (FIG. 4C); velocity correction factor calculation (FIG. 4D); and velocity correction (FIG. 4E). These steps may be continuously performed to attempt to balance the torque of each motor 132. In these figures, controller 200 is represented as having different components for performing the different steps. However, these components are intended to represent functionality rather than structurally separate components. Accordingly, controller 200 could be configured in any suitable way to accomplish the steps of the torque balancing scheme.

In the example and for simplicity, it will be assumed that controller 200 initially outputs velocity controls to cause each wheel 130 to rotate at that same velocity of 1000 RPMs (the "ideal velocity" as described further below). It is noted however that, in some embodiments, controller 200 may adjust the velocity controls to rotate wheels 130 at different ideal velocities during a turn as is described in U.S. Pat. Publ. No. 2023/0076632. Such adjustments are separate from those made as part of the torque balancing scheme. For example, during a turn, the wheel at the outside of the turn may be rotated at a temporarily higher ideal velocity (e.g., 1010 RPM) to prevent the tire from skidding, but may return to an ideal velocity of 1000 RPM once the turn is complete. In comparison, a velocity correction factor generated for the same wheel 130 via the torque balancing scheme would be applied to that wheel's ideal velocity regardless of whether the wheel is turning. In other words, the velocity correction factor is an ongoing adjustment to the ideal velocity intended to balance torque.

FIG. 4A provides an example of how controller 200 can capture torque measurements during the operation of mower 100. As shown, controller 200 can implement a torque measurement sampler 201 that periodically samples/receives the torque measurements from sensors 301 and at least temporarily stores them in corresponding logs. In some embodiments, torque measurement sampler 201 can be configured to filter out torque measurements when one or more operational conditions are not met. For example, in some embodiments, torque measurement sampler 201 could be configured to receive the current ground speed of mower 100 and may filter out any torque measurements when the ground speed is less than a defined threshold (e.g., less than 1 mph). In some embodiments, torque measurement sampler 201 could also or alternatively be configured to receive the current turn angle of mower 100 and may filter out any torque measurements when the turn angle is greater than a defined threshold (e.g., greater than 7 degrees). In other words, torque measurements generated when mower 100 is going too slow and/or turning too sharp can be excluded from further consideration. This filtering could be accomplished in any suitable way such as by foregoing the storage of such torque measurements in the logs, storing but marking such measurements for exclusion, pausing the torque balancing scheme, etc. In some embodiments, torque measurement sampler 201 could consider any other operational condition that may have a transitory effect on the torque of the motors.

FIG. 4B provides an example of how controller 200 can combine the torque measurements to generate a combined torque for each motor 132. As shown, controller 200 can implement a torque combining component 202 that calculates a combined torque from the torque measurements. In some embodiments, the combined torque could be an average of a specified number of torque measurements or an average of torque measurements collected over a specified time period. In other embodiments, the combined torque could be a sum of the torque measurements.

As one example, torque measurement sampler 201 could be configured to sample torque measurements every 25 ms and may filter out any torque measurements when any applicable thresholds are not met. Torque combining component 202 could sum these torque measurements until N torque measurements have been summed. Then, torque combining component 202 could generate the combined torque for each motor by averaging the corresponding summed torque measurements. In such a case, the frequency at which torque combining component 202 outputs updated combined torques would be dependent on how many torque measurements are filtered out. For example, when mower 100 is driven straight at a relatively high speed, updated combined torques may be output ever N*25 ms. In contrast, if mower 100 is performing a turn, updated combined torques may not be output until after the mower has returned to driving straight.

FIG. 4C provides an example of how controller 200 can generate various comparisons from the combined torques. As shown, controller 200 can implement a combined torque comparison component 203 that receives the combined torques for motors 132 and calculates a left-side front-to-rear comparison, a right-side front-to-rear comparison, and a right-to-left comparison. In some embodiments, combined torque comparison component 203 could generate these comparisons on a running basis, periodically, on demand, etc.

Left-side front-to-rear comparison can represent the difference between the combined torques for the motors driving the wheels on the left side of the mower, or in this example, between the combined torques for motors 132$_{L-F}$ and 132$_{L-R}$. In embodiments where the combined torque is a sum of the torque measurements which are in the form of current measurements, the left-side front-to-rear comparison ($\Delta I_{Left}$) could be calculated as follows:

$$\Delta I_{Left} = \sum_{n=1}^{N}(I_{MotorL-R}) - \sum_{n=1}^{N}(I_{MotorL-F})$$

where $I_{MotorL-R}$ represents current measurements for the left, rear motor (e.g., motor 132$_{L-R}$) and $I_{MotorL-R}$ represents current measurements for the left, front motor (e.g., motor 132$_{L-F}$). In such cases, a positive value for the left-side front-to-rear comparison would represent a scenario where the left, rear wheel (e.g., wheel 130$_{L-R}$) is requiring more torque than the left, front wheel (e.g., wheel 130$_{L-F}$) during the time period in which n torque measurements were obtained and vice versa.

Reft-side front-to-rear comparison can represent the difference between the combined torques for the motors driving the wheels on the right side of the mower, or in this example, between the combined torques for motors 132$_{R-F}$ and 132$_{R-R}$. In embodiments where the combined torque is a sum of the torque measurements which are in the form of current measurements, the left-side front-to-rear comparison ($\Delta I_{Right}$) could be calculated as follows:

$$\Delta I_{Right} = \sum_{n=1}^{N}(I_{MotorR-R}) - \sum_{n=1}^{N}(I_{MotorR-F})$$

where $I_{MotorR-R}$ represents current measurements for the right, rear motor (e.g., motor 132$_{R-R}$) and $I_{MotorR-F}$ represents current measurements for the right, front motor (e.g., motor 132$_{R-F}$). In such cases, a positive value for the right-side front-to-rear comparison would represent a scenario where the right, rear wheel (e.g., wheel 130$_{R-R}$) is requiring more torque than the right, front wheel (e.g., wheel 130$_{R-F}$) during the time period in which n torque measurements were obtained and vice versa.

Right-to-left comparison can represent the difference between the combined torques for the motors driving the right wheels (both front and rear motors such as motors 132$_{R-F}$ and 132$_{R-R}$) relative to the combined torques for the motors driving the left wheels (both front and rear such as motors 132$_{L-F}$ and 132$_{L-R}$). In embodiments where the combined torque is a sum of the torque measurements which are in the form of current measurements, the right-to-left comparison ($\Delta I_{Right-Left}$) could be calculated as follows:

$$I_{sum\_total-left} = \sum_{n=1}^{N}(I_{MotorL-F}) + \sum_{n=1}^{N}(I_{MotorL-R})$$

$$I_{sum\_total-right} = \sum_{n=1}^{N}(I_{MotorR-F}) + \sum_{n=1}^{N}(I_{MotorR-R})$$

$$\Delta I_{Right-Left} = I_{sum\_total-right} - I_{sum\_total-left}$$

where $I_{sum\_total-left}$ is the sum of the combined current measurements for the left motors (e.g., motors 132$_{L-F}$ and 132$_{L-R}$) and $I_{sum\_total-right}$ is the sum of the combined current measurements for the right motors (e.g., motors 132$_{R-F}$ and 132$_{R-R}$). Accordingly, a positive value for the right-to-left comparison would represent a scenario where the right wheels (e.g., wheels 130$_{R-F}$ and 130$_{R-R}$) required more torque than the left wheels (e.g., wheels 130$_{L-F}$ and 130$_{L-R}$) during the time period in which N torque measurements were obtained and vice versa.

FIG. 4D provides an example of how controller 200 can calculate velocity correction factors based on the comparisons. As shown, controller 200 can implement a velocity correction factor calculator 204 that receives the left-side front-to-rear comparison, the right-side front-to-rear comparison, and the right-to-left comparison and uses them to determine corresponding velocity correction factors. In some embodiments, balancing component 204 could generate/update velocity correction factors on a running basis, periodically, on demand, etc.

In some embodiments, velocity correction factor calculator 204 can initially set the velocity correction factors to a default value such as 0. Then, as the comparisons are generated/updated while mower 100 is in operation, velocity correction factor calculator 204 can adjust the velocity correction factors appropriately to attempt to balance the torque/current of each motor 132.

In some embodiments, velocity correction factor calculator 204 could calculate a left-side velocity correction factor ($V_{f(left)}$) as follows:

$$V_{f\,(left)} = V_{f(left)} + (\alpha + \delta * \Delta I_{Left})\ \{\text{if } \Delta I_{left} > I_{threshold}$$

$$V_{f\,(left)} = V_{f(left)} - (\alpha + \delta * \Delta I_{Left})\ \{\text{if } \Delta I_{left} < -I_{threshold}$$

where $I_{threshold}$ is a defined threshold (e.g., 3-10 Amps) used to prevent adjustments to the velocity correction factor when the respective motors are largely experiencing the same torque, a is velocity correction step constant (e.g., a value between 0.0001% to 0.001%) and δ is proportional step constant (e.g., a value between 0.00001% and 0.0001%). Accordingly, the left-side velocity correction factor can be incremented when the left, rear motor (e.g., motor 132$_{L-R}$) required more torque and decremented when the left, front motor (e.g., motor 132$_{L-F}$) required more torque during the time period to which the left-side velocity correction factor pertains.

In some embodiments, velocity correction factor calculator 204 could calculate a right-side velocity correction factor ($V_{f(right)}$) as follows:

$$V_{f\,(right)} = V_{f\,(right)} + (\alpha + \delta * \Delta I_{Right})\ \{\text{if } \Delta I_{right} > I_{threshold}$$

$$V_{f\,(right)} = V_{f\,(right)} - (\alpha + \delta * \Delta I_{Right})\ \{\text{if } \Delta I_{right} < -I_{threshold}$$

Accordingly, the right-side velocity correction factor can be incremented when the right, rear motor (e.g., motor 132$_{R-R}$) required more torque and decremented when the right, front motor (e.g., motor 132$_{R-F}$) required more torque during the time period to which the right-side velocity correction factor pertains.

In some embodiments, velocity correction factor calculator 204 could calculate a right-to-left velocity correction factor ($V_{f(right-to-left)}$) as follows:

$$V_{f\,(right-to-left)} = V_{f\,(right-to-left)} + \beta\ \{\text{if } \Delta I_{Right-Left} > I_{Side-threshold}$$

$$V_{f\,(right-to-left)} = V_{f\,(right-to-left)} - \beta\ \{\text{if } \Delta I_{Right-Left} < -I_{Side-threshold}$$

where $I_{Side-threshold}$ is similar to $I_{threshold}$ but allows a different threshold to be used for the right-to-left velocity correction factor and B, like a, is velocity correction step constant (e.g., a value between 0.0001% to 0.001%). Accordingly, velocity correction factor calculator 204 may either increment or decrement the right-to-left velocity correction factor by the same step β when the difference between the respective combined torque measurements exceeds the threshold. Accordingly, the right-to-left velocity correction factor can be incremented when the right motors (e.g., motors 132$_{R-F}$ and 132$_{R-R}$) required more torque and decremented when the left motors (e.g., motors 132$_{L-F}$ and 132$_{L-R}$) required more torque during the time period to which the right-to-left velocity correction factor pertains.

In some embodiments, the left-side velocity correction factor ($V_{f(left)}$), the right-side velocity correction factor ($V_{f(right)}$), and the right-to-left velocity correction factor ($V_{f(right-to-left)}$) can be limited to minimum and maximum values. For example, each velocity correction factor could have a minimum between −4% and −2% and a maximum between 2% and 4%.

FIG. 4E provides an example of how controller 200 can correct the velocities of motors 132 to attempt to balance their torques. As shown, controller 200 can implement a velocity corrector 205 that receives the left-side velocity correction factor, the right-side velocity correction factor, and the right-to-left velocity correction factor and uses them to calculate a corrected velocity from the current ideal velocity for each of motors 132. Velocity corrector 205 can cause the velocity controls provided to motors 132 to specify the corrected velocities rather than the ideal velocities.

As introduced above, the term "ideal velocity" represents the velocity (e.g., in RPMs) for the respective motor/wheel that is determined as part of operating in velocity mode. For example, the ideal velocities could be the velocities controller 200 would otherwise output when it does not implement a torque balancing scheme in accordance with embodiments of the present invention or does not need to balance torque. In other words, it would be ideal if torque imbalances did not arise such that the velocities would not need to be corrected. As a simplified example, if controller 200 is attempting to cause mower 100 to travel straight at a ground speed of 10 mph, the tires on wheels 130 have a diameter of 32 inches and there is a 4:1 transmission ratio between motors 132 and wheels 130, controller 200 could output velocity controls specifying ideal velocities of 420 RPM for each of motors 132. In such a case, even though each motor 132 is rotated at the same RPM, torque imbalances can arise. The term "corrected velocity" represents the velocity for the respective motor/wheel that velocity corrector 205 calculates by applying the corresponding velocity correction factor(s) to the respective ideal velocity.

In some embodiments, velocity corrector 205 may calculate the corrected velocities (ωL-F(corrected), $\omega_{L\text{-}R(corrected)}$, $\omega_{R\text{-}F(corrected)}$, $\omega_{R\text{-}R(corrected)}$) from the ideal velocities ($\omega_{L\text{-}F(ideal)}$, $\omega_{L\text{-}R(ideal)}$, $\omega_{R\text{-}F(ideal)}$, $\omega_{R\text{-}R(ideal)}$) as follows:

$$\omega_{L-F\,(corrected)} = \omega_{L-F\,(ideal)} * (1 + V_{f\,(left)}) * (1 + V_{f\,(right-to-left)})$$

$$\omega_{L-R\,(corrected)} = \omega_{L-R\,(ideal)} * (1 - V_{f\,(left)}) * (1 + V_{f\,(right-to-left)})$$

$$\omega_{R-F\,(corrected)} = \omega_{R-F\,(ideal)} * (1 + V_{f\,(right)}) * (1 - V_{f\,(right-to-left)})$$

$$\omega_{R-R\,(corrected)} = \omega_{R-R\,(ideal)} * (1 - V_{f\,(Right)}) * (1 - V_{f\,(right-to-left)})$$

Continuing the simplified example above in which the ideal velocities are each 420 RPM and assuming $V_{f(left)}$ is determined to be 0.0001 (which could be the case when $V_{f(left)}$ was previously 0, the combined torque for the left, rear motor (e.g., motor $\mathbf{132}_{L\text{-}R}$) exceeded the combined torque for the left, front motor (e.g., motor $\mathbf{132}_{L\text{-}R}$) in excess of the defined threshold ($I_{threshold}$) and $\alpha+\delta*\Delta I_{Left}$ is equal to 0.0001) and that $V_{(f(right\text{-}to\text{-}left)}$) is 0, the corrected velocities $\omega_{L\text{-}F(corrected)}$ and $\omega_{L\text{-}R(corrected)}$ would be 1.0001 and 0.9999 times the ideal velocities $\omega_{L\text{-}F(ideal)}$ and $\omega_{L\text{-}R(ideal)}$ respectively. As a result, the left, front wheel $\mathbf{130}_{L\text{-}F}$ would be rotated at a higher velocity (relative to its current ideal velocity) and the left, rear wheel $\mathbf{130}_{L\text{-}R}$ would be rotated at a lower velocity (relative to its current ideal velocity) to attempt to balance the torque. In other words, increasing the velocity of the left, front wheel $\mathbf{130}_{L\text{-}F}$ and decreasing the velocity of the left, rear wheel $\mathbf{130}_{L\text{-}R}$ is intended to cause the torque of the left-rear motor $\mathbf{132}_{L\text{-}R}$ to decrease towards the torque of the left-front motor $\mathbf{132}_{L\text{-}F}$. As the steps of the torque balancing scheme are repeatedly performed, the resulting small changes in the velocities should cause the torques to remain substantially balanced even as unpredictable or unaccounted for conditions arise and/or change.

The steps represented in FIGS. 4A-4E can be repeatedly performed to continuously adjust the velocities of each motor as necessary to attempt to balance their torques. In a case where a mower has only three wheels, such as two front wheels and one rear wheel, comparisons could be made between each pair of wheels (e.g., left, front to rear, right, front to rear, and left, front to right, front) and then appropriate correction factors could be calculated.

In some embodiments, controller 200 may be configured to implement the steps described above but in the context of temperature rather than torque (e.g., by sampling temperature of each motor (possibly with filtering), combining the temperature measurements, comparing the combined temperatures, and calculating velocity corrector factors using the comparisons). In some embodiments, controller 200 could calculate the velocity correction factors based both on torque and temperature such as by incorporating a term based on the respective temperature comparison into the equations for the velocity correction factors.

In some embodiments, controller 200 could be configured to calculate and apply a correction to the mower speed when the temperature of any motor exceeds a threshold. For example, if the above-described balancing techniques do not stop a rise in the temperature of a motor, after the temperature exceeds the threshold, controller 200 may apply a linear reduction to the ideal velocities ($\omega_{L\text{-}F(ideal)}$, $\omega_{L\text{-}R(ideal)}$, $\omega_{R\text{-}F(ideal)}$, $\omega_{R\text{-}R(ideal)}$) to effectively slow the ground speed of the mower to prevent overheating. While this linear reduction is applied, controller 200 can continue to implement the balancing techniques. In other words, controller 200 could calculate the corrected velocities ($\omega_{L\text{-}F(corrected)}$, $\omega_{L\text{-}R(corrected)}$, $\omega_{R\text{-}F(corrected)}$, $\omega_{R\text{-}R(corrected)}$) from the linearly reduced ideal velocities.

By implementing embodiments of the present disclosure, a mower can be operated with greater precision, stability, safety and performance even in varying driving conditions. Also, by balancing torque and/or temperature, the lifespan of the motors, tires and other involved components can be extended.

Embodiments of the present disclosure may comprise or utilize special purpose or general-purpose computers including computer hardware, such as, for example, one or more processors and system memory. Embodiments within the scope of the present disclosure also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

What is claimed:

1. A mower comprising:

a plurality of wheels for causing the mower to travel with a ground speed, the plurality of wheels including a left front wheel, a left rear wheel, a right front wheel, and a right rear wheel;

a plurality of motors, wherein each of the plurality of motors rotates a corresponding one of the plurality of wheels, the plurality of motors including a left front motor that rotates the left front wheel, a left rear motor that rotates the left rear wheel, a right front motor that rotates the right front wheel, and a right rear motor that rotates the right rear wheel; and a controller comprising one or more non-transitory computer storage media storing computer executable instructions which when executed cause the controller to implement a torque balancing scheme comprising:

obtaining torque measurements for each of the plurality of motors;

generating a combined torque for each of the plurality of motors using the respective torque measurements;

generating a left-side front-to-rear comparison from the combined torques for the left front motor and the left rear motor and a right-side front-to-rear comparison from the combined torques for the right front motor and the right rear motor;

adjusting a left-side velocity correction factor based on the left-side front-to-rear comparison and a right-side velocity correction factor based on the right-side front-to-rear comparison; and correcting velocities of the left front motor and the left rear motor using the left-side velocity correction factor and velocities of the right front motor and the right rear motor using the right-side velocity correction factor.

2. The mower of claim 1, wherein the combined torque comprises a sum or average of torque measurements for the respective motor.

3. The mower of claim 1, wherein the left-side front-to-rear comparison comprises a difference between the combined torque for the left front motor and the combined torque for the left rear motor.

4. The mower of claim 3, wherein the right-side front-to-rear comparison comprises a difference between the combined torque for the right front motor and the combined torque for the right rear motor.

5. The mower of claim 4, wherein adjusting the left-side velocity correction factor comprises incrementing or decrementing the left-side velocity correction factor based on whether the left-side front-to-rear comparison exceeds a defined threshold.

6. The mower of claim 5, wherein correcting the velocities of the left front motor and the left rear motor using the left-side velocity correction factor comprises applying the left-side velocity correction factor in opposite directions to ideal velocities of the left front motor and the left rear motor to generate corrected velocities for the left front motor and the left rear motor.

7. The mower of claim 6, wherein adjusting the right-side velocity correction factor comprises incrementing or decrementing the right-side velocity correction factor based on whether the right-side front-to-rear comparison exceeds a defined threshold.

8. The mower of claim 7, wherein correcting the velocities of the right front motor and the right rear motor using the right-side velocity correction factor comprises applying the right-side velocity correction factor in opposite directions to ideal velocities of the right front motor and the right rear motor to generate corrected velocities for the right front motor and the right rear motor.

9. The mower of claim 8, wherein the torque balancing scheme further comprises generating a right-to-left comparison between the combined torques for the left front motor and the left rear motor and the combined torques for the right front motor and the right rear motor.

10. The mower of claim 9, wherein the torque balancing scheme further comprises adjusting a right-to-left velocity correction factor based on the right-to-left comparison between the combined torques for the left front motor and the left rear motor and the combined torques for the right front motor and the right rear motor.

11. The mower of claim 10, wherein the velocities of the left front motor, the left rear motor, the right front motor, and the right rear motor are also corrected using the right-to-left velocity correction factor.

12. The mower of claim 1, wherein generating a combined torque comprises filtering torque measurements based on one or both of ground speed or turn angle.

13. The mower of claim 1, wherein the left-side velocity correction factor and the right-side velocity correction factor are each also calculated based on temperature of the plurality of motors.

14. One or more non-statutory computer storage media storing computer executable instructions which when executed implement a torque balancing scheme comprising:

obtaining torque measurements for each of a plurality of motors including a left front motor, a left rear motor, a right front motor, and a right rear motor;

generating a combined torque for each of the motors using the respective torque measurements;

generating a left-side front-to-rear comparison from the combined torques for the left front motor and the left rear motor and a right-side front-to-rear comparison from the combined torques for the right front motor and the right rear motor;

adjusting a left-side velocity correction factor based on the left-side front-to-rear comparison and a right-side velocity correction factor based on the right-side front-to-rear comparison; and correcting velocities of the left front motor and the left rear motor using the left-side velocity correction factor and velocities of the right front motor and the right rear motor using the right-side velocity correction factor.

15. The non-statutory computer storage media of claim 14, wherein the torque balancing scheme further comprises:

generating a right-to-left comparison from the combined torques for the left front motor and the left rear motor and the combined torques for the right front motor and the right rear motor; and adjusting a right-to-left velocity correction factor based on the right-to-left comparison;

wherein the velocities of the left front motor, the left rear motor, the right front motor and the right rear motor are also corrected using the right-to-left velocity correction factor.

16. The non-statutory computer storage media of claim 14, wherein:

correcting the velocities of the left front motor and the left rear motor using the left-side velocity correction factor comprises incrementing the velocity of one of the left front motor and the left rear motor by the left-side velocity correction factor while decrementing the velocity of the other of the left front motor and the left rear motor by the left-side velocity correction factor; and correcting the velocities of the right front motor and the right rear motor using the right-side velocity correction factor comprises incrementing the velocity of one of the right front motor and the right rear motor by the right-side velocity correction factor while decrementing the velocity of the other of the right front motor and the right rear motor by the right-side velocity correction factor.

17. A method for balancing torque of a plurality of motors that each independently rotate one of a plurality of wheels, the plurality of motors including a left front motor that rotates a left front wheel, a left rear motor that rotates a left rear wheel, a right front motor that rotates a right front wheel, and a right rear motor that rotates a right rear wheel, the method comprising:

executing computer executable instructions stored on one or more non-transitory computer storage media to implement a torque balancing scheme, the torque balancing scheme comprising:

obtaining torque measurements for each of the plurality of motors;

generating a combined torque for each of the plurality of motors using the respective torque measurements;

generating a left-side front-to-rear comparison from the combined torques for the left front motor and the left rear motor and a right-side front-to-rear comparison from the combined torques for the right front motor and the right rear motor;

adjusting a left-side velocity correction factor based on the left-side front-to-rear comparison and a right-side velocity correction factor based on the right-side front-to-rear comparison; and correcting velocities of the left front motor and the left rear motor using the left-side velocity correction factor and velocities of the right front motor and the right rear motor using the right-side velocity correction factor.

18. The method of claim 17, wherein the left-side front-to-rear comparison comprises a difference between the combined torque for the left front motor and the combined torque for the left rear motor, and the right-side front-to-rear comparison comprises a difference between the combined torque for the right front motor and the combined torque for the right rear motor.

19. The method of claim 17, wherein generating the combined torque for each of the plurality of motors comprises combining torque measurements for each of the plurality of motors over a period of time.

20. The method of claim 17, wherein one or both of the left-side velocity correction factor or the right-side velocity correction factor is adjusted by an amount that is proportional to a difference between the combined torques used to generate the corresponding left-side front-to-rear comparison or right-side front-to-rear comparison.

* * * * *